United States Patent [19]

Bartholomew

[11] Patent Number: 5,582,210
[45] Date of Patent: Dec. 10, 1996

[54] SPRING METAL FLOW CONTROL APPARATUS

[75] Inventor: Donald D. Bartholomew, Mt. Clemens, Mich.

[73] Assignee: Proprietary Technology, Inc., Bloomfield Hills, Mich.

[21] Appl. No.: 406,889

[22] PCT Filed: Sep. 21, 1992

[86] PCT No.: PCT/US92/08008

§ 371 Date: Mar. 20, 1995

§ 102(e) Date: Mar. 20, 1995

[87] PCT Pub. No.: WO94/07192

PCT Pub. Date: Mar. 31, 1994

[51] Int. Cl.[6] .................................................. F15D 1/02
[52] U.S. Cl. ................................................ 138/45; 138/46
[58] Field of Search ................................. 138/40, 44, 45, 138/46

[56] References Cited

U.S. PATENT DOCUMENTS

| | | | |
|---|---|---|---|
| 1,758,080 | 5/1930 | Klemm, Jr. | 138/46 |
| 2,473,674 | 6/1949 | Boehm | 138/46 |
| 2,678,066 | 5/1954 | Carter | 138/45 |
| 2,899,981 | 8/1959 | Binks | 138/46 |
| 3,431,944 | 3/1969 | Sakuma | 138/45 |
| 3,523,559 | 8/1970 | Gibson | 138/46 |
| 3,995,664 | 12/1976 | Nelson . | |
| 4,092,999 | 6/1978 | Rubrich | 138/45 |
| 4,383,552 | 5/1983 | Baker . | |
| 4,867,198 | 9/1989 | Faust | 138/45 |
| 4,887,637 | 12/1989 | Ketner . | |
| 5,081,847 | 1/1992 | Anderson, Jr. | 138/45 |

Primary Examiner—David Scherbel
Assistant Examiner—James F. Hook
Attorney, Agent, or Firm—Harness, Dickey & Pierce

[57] ABSTRACT

A fluid flow control apparatus 10 which uses a plurality of deformable metal springing arms 98, 108 to position a plurality of metal plates 40, 50, 70 within a chamber 34. The metal plates 40, 50, 70 define a plurality of flow paths to vary the amount of flow through the flow control apparatus 10. By changing the size and quantity of the various flow paths $F_1$, $F_2$, $F_3$ and $F_4$ the flow control apparatus can be tailored to each specific application. The fluid flow control apparatus thus has the durability advantages associated with metal flow controls by using metal spring arms instead of coil springs, and provides the smaller packaging advantages associated with molded rubber flow controls. The apparatus utilizes the deflection of the metal springs instead of the deformation of rubber which will change. The diameter of the apparatus can be as small as ⅜ inch larger than the inlet diameter, and have a length of as little as ⅜ inch.

9 Claims, 3 Drawing Sheets

SPRING METAL FLOW CONTROL APPARATUS

BACKGROUND OF THE INVENTION

The present invention relates to a flow control apparatus. More particularly, the present invention relates to a flow control apparatus which uses a plurality of deformable metal springs and which can be manufactured to occupy the small space of deforming rubber flow controls.

Flow control devices are generally known in the art. Current designs of flow control devices include both a rubber molded flow control device or a metal material flow control device which uses coil springs.

The molded rubber flow control devices used today are very compact and relatively inexpensive. The rubber flow control device operates successfully because the rubber material deforms under the pressure generated by the flow of the liquid. The deformability of the rubber can change drastically over time, thus adversely affecting the operation of the flow control during extended operating conditions. In addition, differing chemistries of the flowing liquid can affect the flexibility of the rubber material and again adversely affecting the operation of the flow control. As can be seen, the molded rubber flow control devices have certain deficiencies which limit their application in the industry for this type of flow control.

The metal material flow control devices which use coil springs help to solve some of the problems associated with the plurality of the molded rubber flow control devices. Unfortunately, the coil springs which are required to achieve proper function of the flow control device require far too much length to fit in the relatively short length occupied by the deforming molded rubber flow control devices. The excessive length of the coil springs requires a flow control device which is significantly larger than its molded rubber counter part. In applications where space is at a premium, these coiled spring designs of flow control devices are not feasible.

Accordingly, what is needed is a flow control which offers both the durability advantages associated with metal material flow control devices and the packaging advantages associated with the molded rubber flow control devices.

SUMMARY OF THE INVENTION

The present invention provides the art With a flow control apparatus which uses a plurality of deformable metal springing arms to position a plurality of metal plates which are disposed within the housing of the flow control apparatus. The metal flow control apparatus thus has the durability advantages associated with the metal flow control devices combined with the packaging advantages associated with the molded deforming rubber flow control devices by replacing the coil springs with deformable metal springing arms. The physical size of the present invention is similar to the physical size of the molded deforming rubber flow control units.

DETAILED DESCRIPTION OF THE INVENTION

Figure 1:
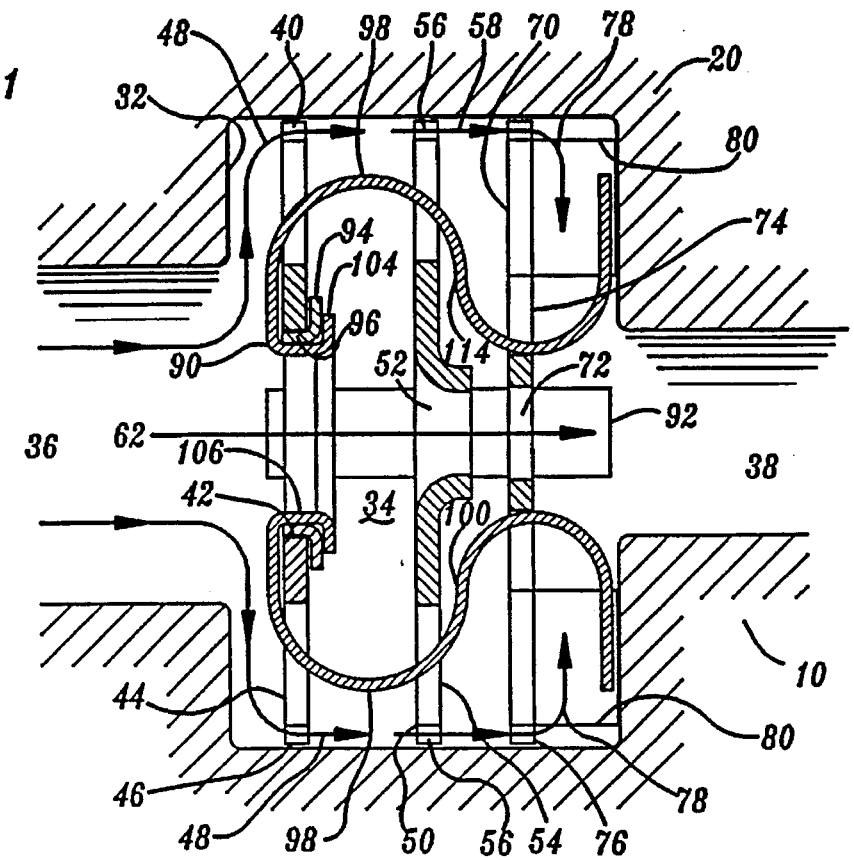
FIG. 1 is a side elevation view partially in cross section of a flow control apparatus in accordance with the present invention.
Figure 2:
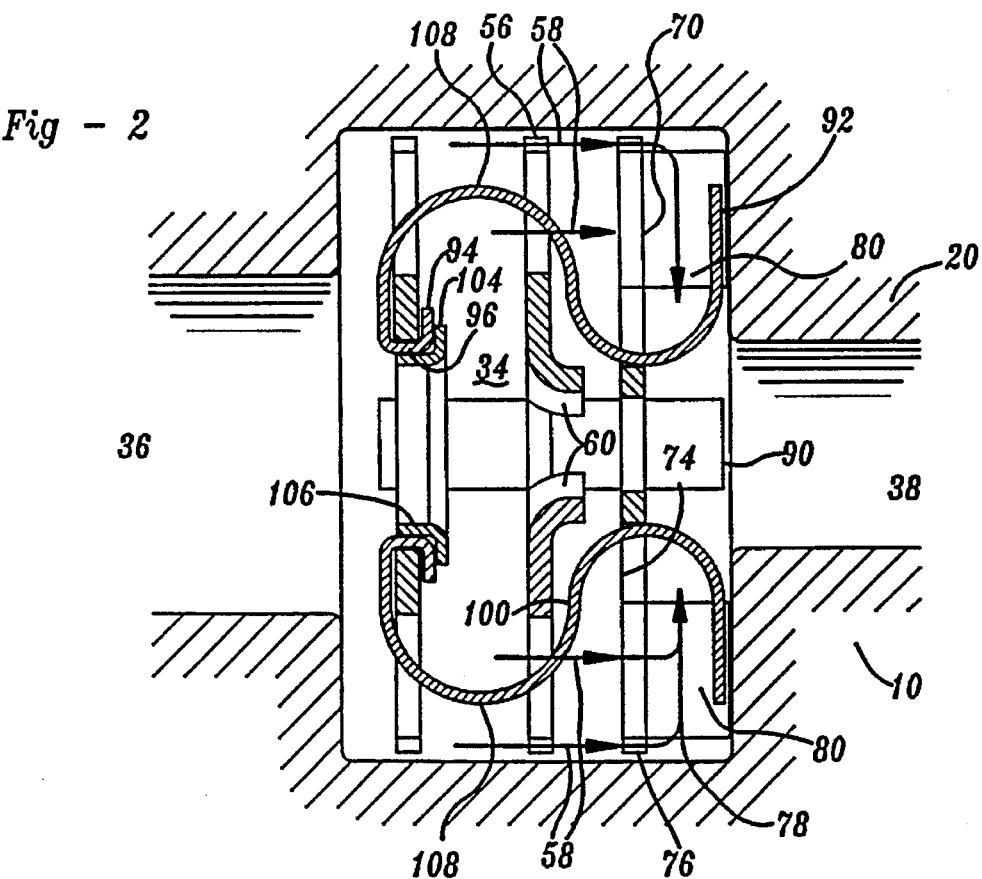
FIG. 2 is a side elevation view partially in cross section taken at 90° axially to the view in FIG. 1.

FIGS. 1 and 2 show a flow control apparatus designated as reference numeral 10 in accordance with the present invention. The flow control apparatus comprises a housing 20, a circular front plate 40, a circular middle plate 50, a circular end plate 70, a first spring member 90 and a second spring member 92.

Housing 20 has an interior wall 32 which defines a generally cylindrical chamber 34. Cylindrical chamber 34 has a generally circular inlet 36 and a generally circular outlet 38. Normally the diameter of inlet 36 is larger than the diameter of outlet 38. A central flow path 62 is the portion of the inward flow to flow control 10 which is directed from inlet 36, through the center of flow control 10 to outlet 38.

Disposed within cylindrical chamber 34 is circular front plate 40. Front plate 40 defines a central circular bore 42 extending completely through front plate 40 and a plurality of circumferentially spaced radially extending slots 44. Slots 44 also extend completely through front plate 40 beginning at a radius slightly larger than the radius of circular bore 42 and extending radially outward. A plurality of circumferentially spaced and radially outward extending tabs 46 are located on the outer edge of front plate 40. Front plate 40 is disposed within cylindrical chamber 34 such that tabs 46 generally center plate 40 within chamber 34 as shown in FIG. 1. Plate 40 is free to move axially within chamber 34. A first flow path 48 is defined between front plate 40 and cylindrical chamber 34. The width of flow path 48 is defined by the length of the radially extending tabs 46, and slots 44.

Circular middle plate 50 is disposed within cylindrical chamber 34 between front plate 40 and outlet 38. Middle plate 50 defines a central bore 52 extending completely through middle plate 50 and a plurality of circumferentially spaced radially extending slots 54. Slots 54 also extend completely through middle plate 50 beginning at a radius slightly larger than the radius of circular bore 52 and extending radially outward. A plurality of circumferentially spaced and radially outward extending tabs 56 are located on the outer edge of middle plate 50. Middle plate 50 is disposed within cylindrical chamber 34 between front plate 40 and outlet 38 such that tabs 56 generally center plate 50 within chamber 34 as shown in FIG. 1. Plate 50 is free to move axially within chamber 34. A second flow path 58 is defined between middle plate 50 and cylindrical chamber 34. The width of flow path 58 is defined by the length of tabs 56, and slots 54. A plurality of circumferentially spaced generally axially extending tabs 60 are located on the inside edge of circular bore 52. Tabs 60 are used in conjunction with first and second spring members 90, 92 to aid in the centering of middle plate 50 as will be described later herein.

Circular end plate 70 is disposed within cylindrical chamber 34 between middle plate 50 and outlet 38. End plate 70 defines a central bore 72 extending completely through end plate 70 and a plurality of circumferentially spaced radially extending slots 74. Slots 74 also extend completely through end plate 70, beginning at a radius slightly larger than the radius of circular bore 72 and extending radially outward. A plurality of circumferentially spaced and radially outward extending tabs 76 are located on the outer edge of end plate 70. End plate 70 is disposed within cylindrical chamber 34, between middle plate 50 and outlet 38 such that tabs 76 generally center plate 70 within chamber 34 as shown in FIG. 1. Plate 70 is free to move axially within chamber 34. A final outside flow path 78 is defined between end plate 70 and cylindrical chamber 34. The width of flow path 78 is defined by the length of tabs 76, and slots 74. A plurality of legs 80 are located at the plurality of radially extending slots 74. Legs 80 extend from plate 70 outward towards outlet 38 and chamber 34 as shown in FIG. 1. The purpose of legs 80 is to limit the axial travel of end plate 70 as will be described later herein.

Springs 90 and 92 are disposed within cylindrical chamber 34 as shown in FIGS. 1 and 2. Spring 92, shown best in FIG. 2, has a circular ring portion 94 which is used for locating spring 92 relative to front plate 40. Ring portion 94 is integral with cylindrical portion 96. Cylindrical portion 96 has an outside diameter slightly less than the inside diameter of central bore 42 of front plate 40 and extends through front plate 40 as shown in FIG. 2. A pair of S-shaped spring fingers 108 extend from cylindrical portion 96 of spring 92. Spring 92 is positioned in chamber 34 with circular ring portion 94 being located on the outlet side of front plate 40. Cylindrical portion 96 extends from ring portion 94 through circular bore 42 of front plate 40 towards the inlet side of front plate 40. Spring fingers 108 extend from cylindrical ring portion 96 with the first half of each of the spring fingers extending through a respective slot 44 of front plate 40 and then radially outward and through a respective slot 54 of middle plate 50. The second half of each spring finger 108 extends radially inward in the region marked 100. The second half of each spring finger 108 then extends through a respective slot 74 in end plate 70 and abuts the outlet end of chamber 34 as shown in FIG. 2.

Spring 90, shown best in FIG. 1, has a circular ring portion 104 which is used for locating spring 90 relative to both front plate 40 and spring 92. Ring portion 104 is integral with cylindrical portion 106. Cylindrical portion 106 has an outside diameter slightly less than the inside diameter of cylindrical portion 96 of spring 92 and extends through cylindrical portion 96 as shown in FIG. 1. A pair of S-shaped spring fingers 98 extend from cylindrical portion 106 of spring 90. Spring 90 is positioned in chamber 34 with circular ring portion 104 being located on the output side of front plate 40 and spring 92. Cylindrical portion 106 extends from ring portion 104 through cylindrical portion 96 of spring 92 towards the inlet side of front plate 40 and spring 92. Spring fingers 98 extend from cylindrical ring portion 106 with the first half of each of the spring fingers extending through a respective slot 44 of front plate 40 and then radially outward and through a respective slot 54 of middle plate 50. The second half of each spring finger 98 extends radially inward in the region marked 114. The second half of each spring finger 98 then extends through a respective slot 74 in end plate 70 and abuts the outlet end of chamber 34 as shown in FIG. 1.

Prior to the assembly of springs 90 and 92 to front plate 40, cylindrical portions 96 and 106 extend axially and circular ring portions 94 and 104 are not present. Cylindrical portion 96 of spring 92 is first assembled through circular bore 42 of front plate 40. Cylindrical portion 106 of spring 90 is then assembled through the inside diameter of cylindrical portion 96. The free ends of cylindrical portions 96 and 106 of springs 92 and 90, respectively, are then upset to produce circular ring portions 94 and 104, respectively. Ring portion 94 and 104 then locate and position springs 92 and 90, respectively, relative to front plate 40.

Figure 3:
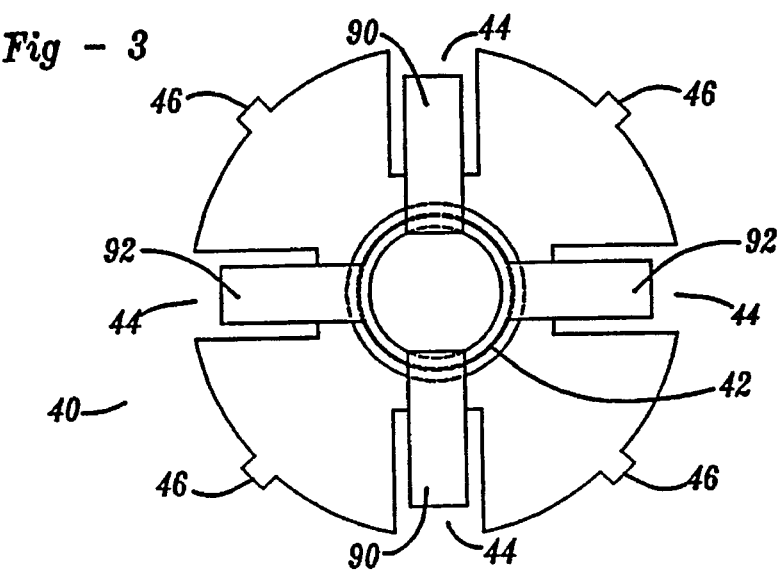
FIG. 3 is an end view of the first moving plate, and part of the springs in FIG. 1.

Referring to FIG. 3, front plate 40 is shown, and the number of each portion of plate 40 is discussed above. Spring control is by spring interface with plate 70.

Figure 4:
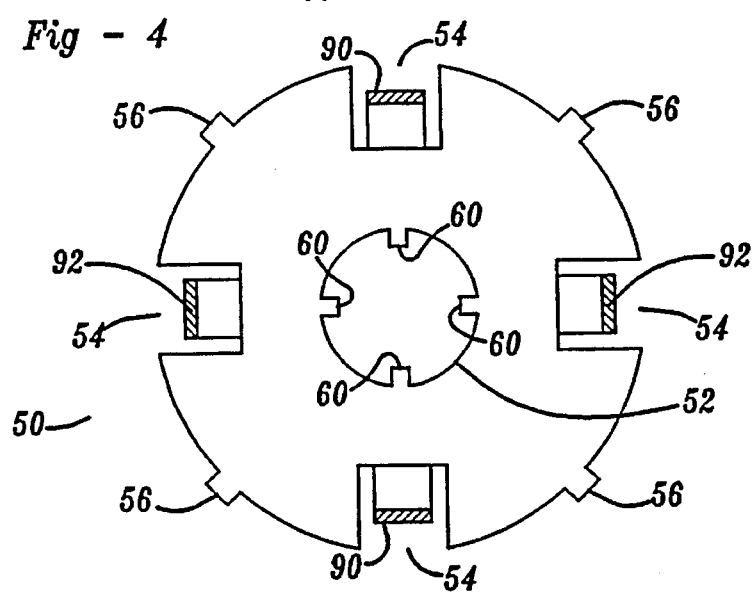
FIG. 4 is an end view of the middle plate of the flow control apparatus shown in FIG. 1.

Referring to FIG. 4, middle plate 50 is shown, and the number of each portion of plate 50 is discussed above.

Figure 5:
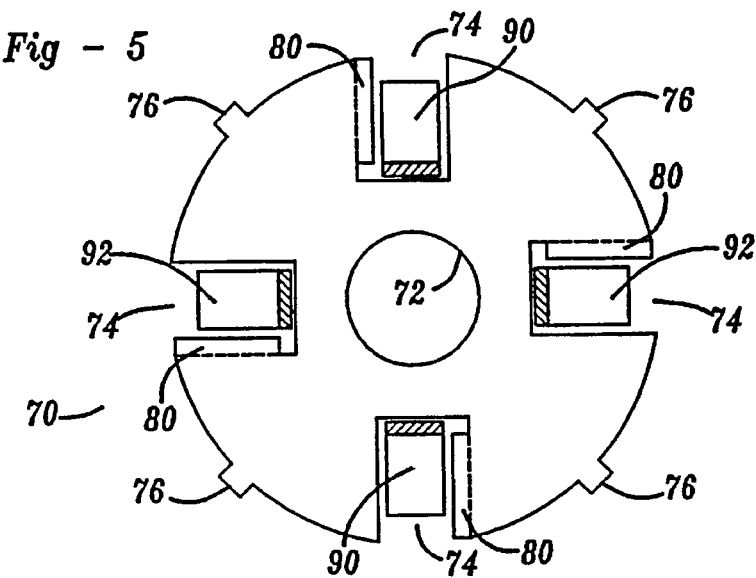
FIG. 5 is an end view of the plate on the right hand side of the flow control apparatus shown in FIG. 1.

Referring to FIG. 5, end plate 70 is shown, and the numbers of each portion of plate 70 is discussed above.

Figure 6:
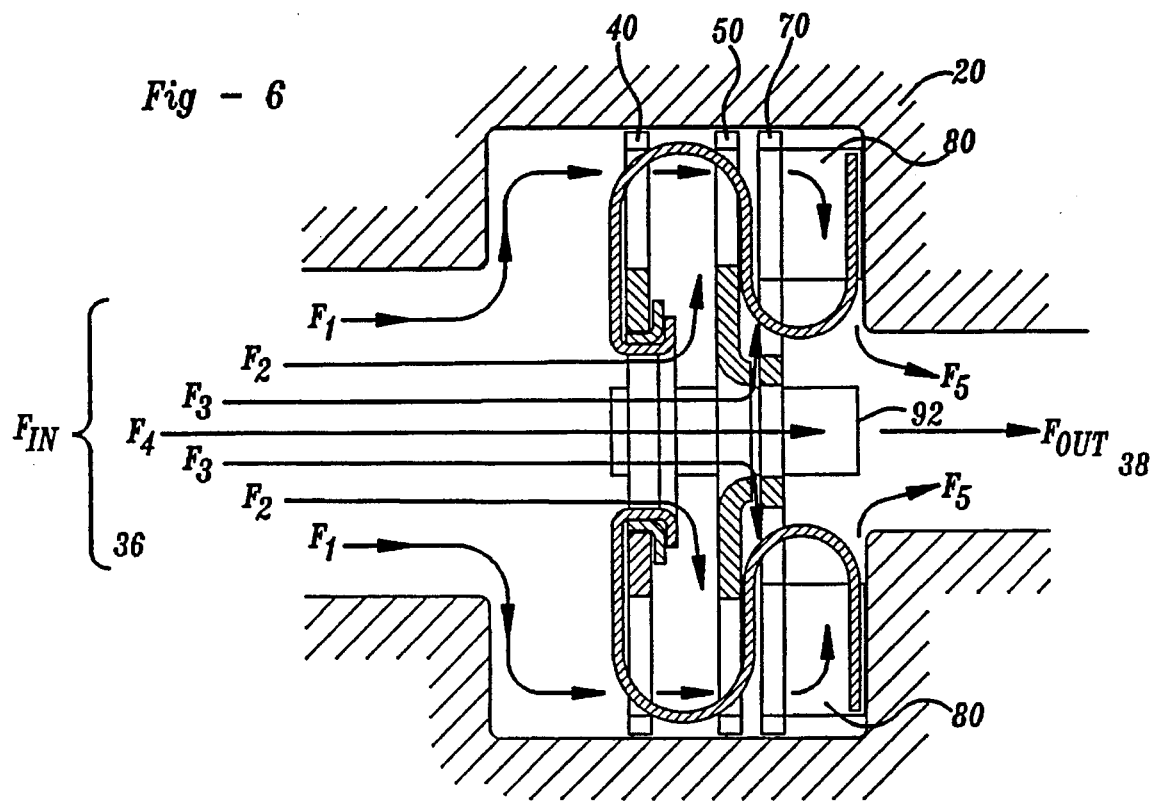
FIG. 6 is a side elevation view partially in cross section of the flow control apparatus of FIG. 1 when the flow control apparatus is in operation.

Referring to FIG. 6, the operation of the flow control shown in the previous figures is shown. The input flow $F_{in}$ is composed of flows $F_1$, $F_2$, $F_3$ and $F_4$ which depict the different flow paths into and through the device. $F_1$ is the flow that flows through the slots and around plate 40 and on to join flow $F_2$ which is the flow around and through the slots of plate 50, and is joined by flow $F_1$. $F_3$ is the flow around and through the slots of plate 70 and is joined by flows $F_1$ and $F_2$. Flow $F_4$ is the flow through the center of the flow control and joins flow $F_5$ (which is the sum of flows $F_1$, $F_2$, and $F_3$) out of the flow control to provide $F_{out}$, which is the total flow through the flow control.

Flows $F_1$, $F_2$, $F_3$ and $F_4$ have been established as a result of the pressure drop across plate 40 which has caused plate 40 to move toward outlet port 38 of housing 20. Movement of plate 40 also distorts springs 90 and 92, which allows repositioning of plate 50 if there is also a pressure drop across plate 50 that will cause plate 50 to move toward outlet 38. A pressure drop across plate 70 also causes plate 70 to move toward outlet 38, but plate 70 movement is stopped by legs 80. The flow $F_5$ is thus assured by the space of plate 70 between the outlet 38 and the end of housing 20 by legs 80. Flow $F_5$ joins through flow $F_4$ as the flow out, $F_{out}$.

Different combinations of $F_{in}$ and pressure drop across the plates, which are resisted by the springs, results in different positions of the three plates and this governs the amount of $F_{out}$. Also, springs 90 and 92, and plates 40, 50 and 70 are dimensioned to produce the desired relationship between the inlet flow $F_{in}$ and the outlet flow $F_{out}$.

Figure 7:
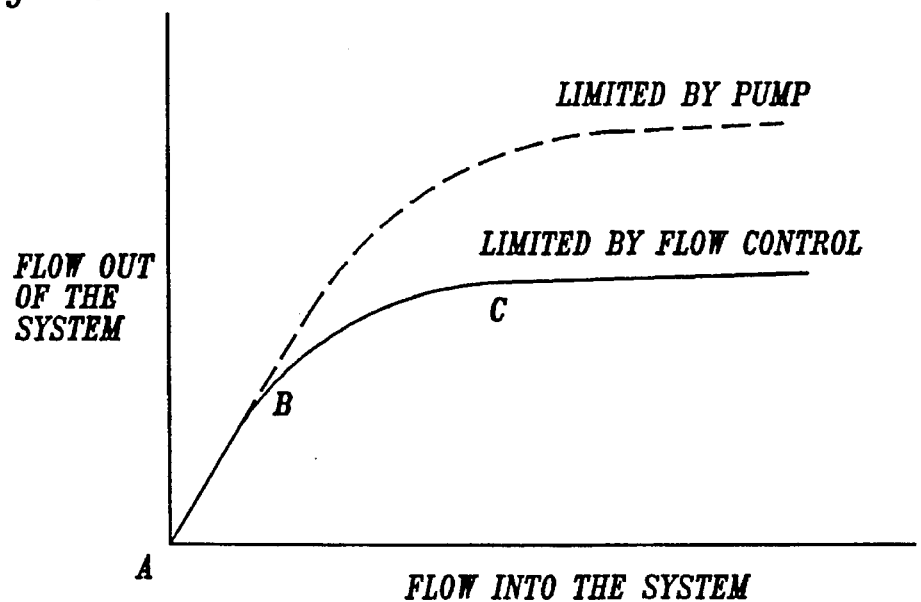
FIG. 7 is a graph showing the relationship of flow and pressure in to flow out of the present invention.

Referring now to FIG. 7, any system for which the flow control is designed has a maximum flow of the system without the flow control in the system, and therefore there is a limit to the input flow $F_{in}$. At the intermediate flows the flow control limits the flow out, $F_{out}$ as is shown in FIG. 7. The operation of the flow control is depicted by the graph shown in FIG. 7. The graph shows a limitation of flow due to the operation of the flow control apparatus (solid line) compared to what would be experienced without a flow control apparatus (dotted line). The limiting factor for the dotted line is the available pump capacity.

Referring again to the graph shown in FIG. 7, Point A is when there is no flow. The springs 90 and 92 separate plates 40, 50 and 70 as shown in the previous figures. As the flow/pressure increases to Point B on the graph, flow/pressure drop around and through plates 40, 50 and 70 begins and the springs 90 and 92 are distorted. This is shown as $F_1$, $F_2$, $F_3$ and $F_4$ in FIG. 6. The output of the flow control $F_{out}$ is a combination of $F_4$ and $F_5$. $F_5$ is a combination of $F_1$, $F_2$ and $F_3$. Initially, $F_1$ is controlled by the size of the first flow path 48, $F_2$ is controlled by the size of the second flow path 58 and the distance between plate 40 and plate 50 and $F_3$ is controlled by the size of the final flow path 78 and the distance between plate 50 and plate 70. The size relationship between the flow paths is that flow path 48 is the smallest, flow path 58 is the larger and flow path 78 is larger than both flow paths 48 and 58, and the flow path established by legs 80 accommodates all outside and through slot flows, and sets a minimum flow $F_5$.

As the flow/pressure increases the flow/pressure drop about plate 40 will cause the springs 90 and 92 to compress, thus moving plates 40, 50 and 70 from the open position shown in FIG. 1 towards the position as shown in FIG. 6. As the spacing between plates 40, 50 and 70 decreases the amount of flow $F_2$ and $F_3$ will also decrease. $F_1$ will be sensitive to the input flow rate, and move plate 50 to reposition the remaining plates.

When the flow/pressure input reaches point C, plates 40, 50 and 70 are forced towards the output side of the chamber 34 as shown in FIG. 6. At this point $F_2$ and $F_3$ are at a minimum due to the minimum distance between plates 40, 50 and 70. The plurality of legs 80 are biased against the outlet end of chamber 34 and insure that a minimum distance will always be maintained between plate 70 and the outlet end of chamber 34. This minimum distance thus defines the minimum value of $F_5$ and the throughput of the flow control apparatus $F_{out}$ which is a combination of $F_4$ and $F_5$.

Various factors will affect the shape of the curve shown in FIG. 7. The size and configuration of the plates 40, 50 and 70 will change the shape of the curve. The plates can be changed in size to affect flow passages, 48, 58 and 78, cylindrical bores 42, 52 and 72 can be varied in size affecting the value of $F_4$ and the pressure drop which causes force on plates 40, 50 and 70. The plates may have any combination of bumps, ribs or holes that either add to the strength of the plate or affect the flow around and through the plates, or other features can be provided to tailor the curve shown in FIG. 7 to a particular application.

In addition, the size, quantity and thickness of the spring fingers 98 and 108 can be altered in order to modify the shape of the curve shown in FIG. 7 to achieve a desired result.

While plates 40, 50 and 70 have been shown as three flat plates, it is within the scope of the present invention to have any or all of them conically shaped or to use less than or more than three plates to achieve the desired result.

While the above detailed description describes the preferred embodiments of the present invention, it should be understood that the present invention is susceptible to modification, variation and alteration without deviating from the scope and fair meaning of the subjoined claims.

What is claimed is:

1. A fluid flow control apparatus comprising:

a housing having a chamber, said chamber having an inlet port and an outlet port;

a plurality of separate plates disposed within said chamber, each of said plurality of plates being movable within said chamber from a first position to a second position, said plurality of separate plates each having a central bore and at least one slot spaced from said central bore;

a first fluid flow path between said inlet port, said at least one slot, and said outlet port, said first fluid flow path being disposed between adjacent plates, said first fluid flow path being reduced in size as said plates are moved from said first position to said second position;

a second fluid flow path between said inlet port, said central bore, and said outlet port, said second fluid flow path extending through said plurality of plates, said second fluid flow path remaining constant in size as said plates are moved from said first position to said second position; and means for biasing said plurality of plates into said first positions by said biasing means acting on at least two of said plates such that as said fluid flow enters said inlet port, said biasing means extending through said plates through said at least one slot, said plurality of plates are moved from said first positions towards said second positions by pressure from said fluid flow to control the amount of fluid flowing through said first fluid flow path.

2. The fluid flow control apparatus of claim 1 wherein at least one plate of said plurality of plates has a plurality of circumferentially spaced radially extending tabs, said first fluid flow path extending between said at least one plate and said housing.

3. The fluid flow control apparatus of claim 1 wherein at least one plate of said plurality of plates is partially conical.

4. The fluid flow control apparatus of claim 1 wherein said plurality of plates is equal to three.

5. The fluid flow control apparatus of claim 1 wherein at least one of said plurality of plates comprises:

a circular body having a plurality of circumferentially spaced radially extending slots and a central bore;

said circular body further having an outside edge and a plurality of circumferentially spaced tabs extending radially outward from said outside edge.

6. The fluid flow control apparatus of claim 1 wherein at least one of said plurality of plates comprises:

a circular body having a plurality of circumferentially spaced radially extending slots and a central bore with an inside edge;

said circular body further having an outside edge and a first plurality of circumferentially spaced tabs extending radially outward from said outside edge; and a second plurality of circumferentially spaced tabs extending from said inside edge of said central bore.

7. The fluid flow control apparatus of claim 1 wherein at least one of said plurality of plates comprises:

a circular body having a plurality of circumferentially spaced radially extending slots and a central bore;

said circular body further having an outside edge and a first plurality of circumferentially spaced tabs extending radially outward from said outside edge; and a second plurality of tabs angularly extending from an edge of at least one of said plurality of slots.

8. The fluid flow control apparatus of claim 1 wherein said biasing means comprises a plurality of S-shaped compression springs.

9. A fluid flow control apparatus comprising;

a housing having a chamber, said chamber having an inlet port and an outlet port;

a variable sized fluid path extending between said inlet port and said outlet port;

a constant sized fluid path extending between said inlet port and said outlet port;

a first plate disposed within said chamber adjacent said inlet port, said first plate having a plurality of circumferentially spaced radially extending slots and a first central bore, said constant sized fluid path extending through said first central bore, said first plate further having an outside edge and a plurality of circumferentially spaced tabs radially extending outward from said outside edge of said first plate, said plurality of tabs of said first plate centrally locating said first plate in said chamber such that said variable sized fluid path is located between said chamber and said first plate, said first plate being movable between a first position and a second position;

a second plate disposed within said chamber between said first plate and said outlet port, said second plate having a plurality of circumferentially spaced radially extending slots and a second central bore with an inside edge, said constant sized fluid path extending through said second central bore, said second plate further having an outside edge and a first plurality of circumferentially spaced tabs radially extending outward from said outside edge of said second plate, said plurality of tabs of said second plate centrally locating said second plate in said chamber such that said variable sized fluid path is located between said chamber and said second plate, said second plate further having a second plurality of circumferentially spaced tabs extending generally perpendicular from said inside edge of said second central bore, said second plate being movable between a first position and a second position;

a third plate disposed within said chamber between said second plate and said outlet port, said third plate having a plurality of circumferentially spaced radially extending slots and a third central bore, said constant sized fluid path extending through said third central bore, said third plate further having an outside edge and a first plurality of circumferentially spaced tabs radially extending outward from said outside edge of said third plate, said plurality of tabs of said third plate centrally locating said third plate in said chamber such that said variable sized fluid path is created between said chamber and said third plate, said third plate further having a second plurality of tabs angularly extending from an inside edge of each of said plurality of slots of said third plate towards said outlet port, said third plate being movable between a first position and a second position; and a plurality of S-shaped compression springs extending through said slots in said first, second and third plates for biasing said first, second and third plates into their said respective first positions such that as said fluid flow enters said inlet port, said first, second and third plates are moved from said first positions towards said second positions by pressure from said fluid flow to control the amount of fluid flowing through said variable sized fluid path.

* * * * *